United States Patent
Wang

(10) Patent No.: US 12,487,334 B2
(45) Date of Patent: Dec. 2, 2025

(54) OPTICAL ANTENNA, OPTICAL PHASED ARRAY TRANSMITTER, AND LIDAR SYSTEM USING THE SAME

(71) Applicant: SUTENG INNOVATION TECHNOLOGY CO., LTD., Shenzhen (CN)

(72) Inventor: Jing Wang, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 1005 days.

(21) Appl. No.: 17/567,960

(22) Filed: Jan. 4, 2022

(65) Prior Publication Data
US 2022/0128661 A1 Apr. 28, 2022

Related U.S. Application Data

(63) Continuation of application No. PCT/CN2019/095484, filed on Jul. 10, 2019.

(51) Int. Cl.
G01S 7/481 (2006.01)
G01S 17/86 (2020.01)
(Continued)

(52) U.S. Cl.
CPC .......... *G01S 7/4814* (2013.01); *G01S 17/86* (2020.01); *G02B 6/124* (2013.01);
(Continued)

(58) Field of Classification Search
CPC ...... G01S 7/4814; G01S 17/86; G01S 17/931; G02B 6/124; G02B 27/0087;
(Continued)

(56) References Cited

U.S. PATENT DOCUMENTS 9,285,554 B2 * 3/2016 Doany ................ G02B 6/32
9,696,605 B2 * 7/2017 Russo ................ G02B 27/10
(Continued)

FOREIGN PATENT DOCUMENTS

CA 2298251 A1 8/2000
CN 101995610 A 3/2011
(Continued)

OTHER PUBLICATIONS

D. Chandler-Horowitz et al., Assessment of Ultra-thin SiO2 Film Thickness Measurement Precision by Ellipsometry, 683 AIP Conference Proceedings 326-330 (2003). (Year: 2003).*
(Continued)

*Primary Examiner* — Thomas K Pham
(74) *Attorney, Agent, or Firm* — BAYES PLLC

(57) ABSTRACT

An optical antenna, an optical phased array transmitter, and a lidar system using the same are provided. The optical antenna includes a substrate that forms at least a portion of a reflector layer having a first material, a waveguide layer disposed above the reflector layer and having a second material, a separation layer disposed between the waveguide layer and the reflector layer and having a third material. The waveguide layer further has a first grating array. The reflector layer reflects the light emitted downwards from the waveguide layer. The refractive index of the third material is smaller than that of either the first material or the second material.

16 Claims, 8 Drawing Sheets

(51) Int. Cl.
*G02B 6/124* (2006.01)
*G02B 27/00* (2006.01)
*G02B 6/12* (2006.01)

(52) U.S. Cl.
CPC .................. *G02B 27/0087* (2013.01); *G02B 2006/12104* (2013.01); *G02B 2006/12107* (2013.01)

(58) Field of Classification Search
CPC ........... G02B 2006/12104; G02B 2006/12107; G02F 1/2955
See application file for complete search history.

(56) References Cited

U.S. PATENT DOCUMENTS

| | | | | |
|---|---|---|---|---|
| 10,303,037 | B2* | 5/2019 | Spector | .................. G01S 17/42 |
| 10,690,848 | B2* | 6/2020 | Menezo | ................. G02B 6/124 |
| 11,194,099 | B2* | 12/2021 | Wang | ....................... G02B 6/34 |
| 11,333,826 | B2* | 5/2022 | Zhou | ....................... G02B 6/124 |
| 12,013,491 | B2* | 6/2024 | Nakamura | ........... G02B 5/1861 |
| 2016/0320475 | A1 | 11/2016 | Kellar | |
| 2019/0033522 | A1* | 1/2019 | Baba | ...................... G02B 6/125 |
| 2019/0129008 | A1* | 5/2019 | Lin | ....................... G01S 7/4804 |
| 2020/0218012 | A1 | 7/2020 | Wang et al. | |

FOREIGN PATENT DOCUMENTS

| | | | |
|---|---|---|---|
| CN | 107765363 | A | 3/2018 |
| CN | 108398842 | A | 8/2018 |
| CN | 109358394 | A | 2/2019 |
| CN | 109387820 | A | 2/2019 |
| CN | 109491010 | A | 3/2019 |
| CN | 109541744 | A | 3/2019 |
| WO | 2019130720 | A1 | 7/2019 |
| WO | WO-2019211298 | A1 * | 11/2019 |
| WO | WO-2020191303 | A1 * | 9/2020 ........... G01S 17/003 |

OTHER PUBLICATIONS

Martijn J.R. Heck, Highly Integrated Optical Phase Arrays: Photonic Integrated Circuits for Optical Beam Shaping and Beam Steering, 6 Nanophotonics 93-107 (2017). (Year: 2017).*

Sung Won Chung et al., A Monolithically Integrated Large-Scale Optical Phased Array in Silicon-on-Insulator CMOS, 53 IEEE Journal of Solid-State Circuits 275-296 (2018). (Year: 2018).*

Diffraction Grating Physics, 2021, pp. 1-4 [online], [retrieved Mar. 22, 2025], retrieved from the Internet <URL: https://web.archive.org/web/20210303001608/https://www.newport.com/n/diffraction-grating-physics>. (Year: 2021).*

International Search Report and Written Opinion issued in corresponding international application No. PCT/CN2019/095484, dated Apr. 3, 2020, 7 pages.

European Search Report issued in related European Application No. EP19936869.7, mailed Jul. 5, 2022, 9 pages.

* cited by examiner

600

800

OPTICAL ANTENNA, OPTICAL PHASED ARRAY TRANSMITTER, AND LIDAR SYSTEM USING THE SAME

CROSS-REFERENCE TO RELATED APPLICATION

The present application is a continuation of International Application No. PCT/CN2019/095484, filed on Jul. 10, 2019, which is incorporated herein by reference in its entirety.

TECHNICAL FIELD

The present disclosure relates to an optical antenna, an optical phased array ("OPA") transmitter, and a lidar system using the same, and more particularly to a movable vehicle using an OPA lidar system for distance sensing, environment mapping, and obstacle detection.

BACKGROUND

Distance sensing and environment mapping have recently become a heated research area with various industrial applications. For example, it allows security systems to spot suspicious approaching objects. It also enables drones or robots to perceive the surrounding environment and estimate how far away the objects are in the environment for obstacle avoidance purpose. The potential largest and most prominent application, though, is in autonomous driving, which requires a vehicle to be capable of sensing distance and obstacles (pedestrians, other vehicles, road blocks, trees, etc.) in order to replace human drivers for vehicle maneuvering under complicated road conditions.

To achieve this purpose, a time-of-flight device is often used. A time-of-flight device measures the time taken by a wave (e.g., acoustic, electromagnetic, etc.) to travel a distance between itself and an object. Equipped with a receiver that receives the wave bounced back from the object and knowing the speed of the travelling wave, the time-of-flight device is able to calculate the distance between the device and the object, thus identifying its spatial position. Conventional types of time-of-flight device include ultrasonic distance-measuring device and radar. More recently, devices using lidar (acronym for "Light Detection and Ranging") technology find their way into autonomous driving applications. A lidar uses pulsed laser light to measure the distance between itself and a large number of points in the three-dimensional ("3D") space, often millions or more, in order to obtain the distance and 3D representation information of an object in the 3D space.

Most lidar systems currently available on the market for commercial use are mechanical lidars, which employ a lidar scanner spinning at a high speed to emit light into the environment with, for example, a 360° field of view. However, mechanical lidars are often vulnerable to mechanical failures, which reduce reliability and longevity of use. They are also very bulky and thus have to be mounted on top of vehicles, making themselves aesthetically less appealing to potential users.

As the lidar technology develops, solid-state lidars have been introduced as a compact and low-cost alternative that satisfy the needs of distance sensing and environment mapping in autonomous driving. A solid-state lidar uses a photonic integrated circuit ("PIC") to emit laser beams from semiconductor components into the environment. The laser beams can be steered into different directions with light deflecting components (such as collimators) installed in the lidar, therefore dispensing the need to rotate the lidar scanner. After the beam reaches a target and is reflected back, an optical receiver of the lidar may receive the beam and converts the light signal into an electronic signal for subsequent processing. The processing electronics of the lidar may transform the electronic signal into point clouds, which are used to reconstruct a 3D representation of the environment that also includes a rendering of the sensed targets.

Solid-state lidars, especially those OPA lidars, are still being developed and not fully commercialized for various reasons. OPA lidars have a major obstacle of relatively low efficiency of light emission as compared to mechanical lidars, thus requiring high power; otherwise, the accuracy of reception and data processing is decreased. Therefore, there is a need to provide a high-efficiency optical antenna, an OPA transmitter, and a lidar system using the same, all of which reduce energy waste and facilitate the commercialization of solid-state lidars.

SUMMARY

The present disclosure relates to apparatuses for light transmission. More specifically, such apparatuses may include optical antennas, OPA transmitters, and lidar systems using the same.

In one aspect, embodiments of the disclosure provide an optical antenna for light transmission. The optical antenna includes a substrate that forms at least a portion of a reflector layer having a first material, a waveguide layer disposed above the reflector layer and having a second material, a separation layer disposed between the waveguide layer and the reflector layer and having a third material. The waveguide layer further has a first grating array. The reflector layer reflects the light emitted downwards from the waveguide layer. The refractive index of the third material is smaller than that of either the first material or the second material.

In another aspect, embodiments of the disclosure provide an OPA transmitter. The OPA transmitter includes a light source, an optical splitter optically coupled to the light source and splitting one beam of light emitted from the light source into a plurality of beams of light, a phase shifter optically coupled to the optical splitter and having a plurality of channels, and an optical antenna optically coupled to the phase shifter and having a plurality of emitters. Each of the emitters further has a substrate that forms at least a portion of a reflector layer having a first material, a waveguide layer disposed above the reflector layer and having a second material and a grating array, a separation layer disposed between the waveguide layer and the reflector layer and having a third material. The reflector layer reflects the light emitted downwards from the waveguide layer. The refractive index of the third material is smaller than that of either the first material or the second material.

In a further aspect, embodiments of the disclosure provide a lidar system. The lidar system includes an OPA transmitter having a first optical antenna that has a plurality of emitters, an OPA receiver having a second optical antenna that has a plurality of receiving elements, system electronics, and a power supply. Each of the emitters and the receiving elements further has a substrate that forms at least a portion of a reflector layer having a first material, a waveguide layer disposed above the reflector layer and having a second material and a grating array, a separation layer disposed between the waveguide layer and the reflector layer and having a third material. The reflector layer reflects the light emitted downwards from the waveguide layer. The refractive index of the third material is smaller than that of either the first material or the second material.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same or like reference numbers will be used throughout the drawings to refer to the same or like parts.

Figure 1:
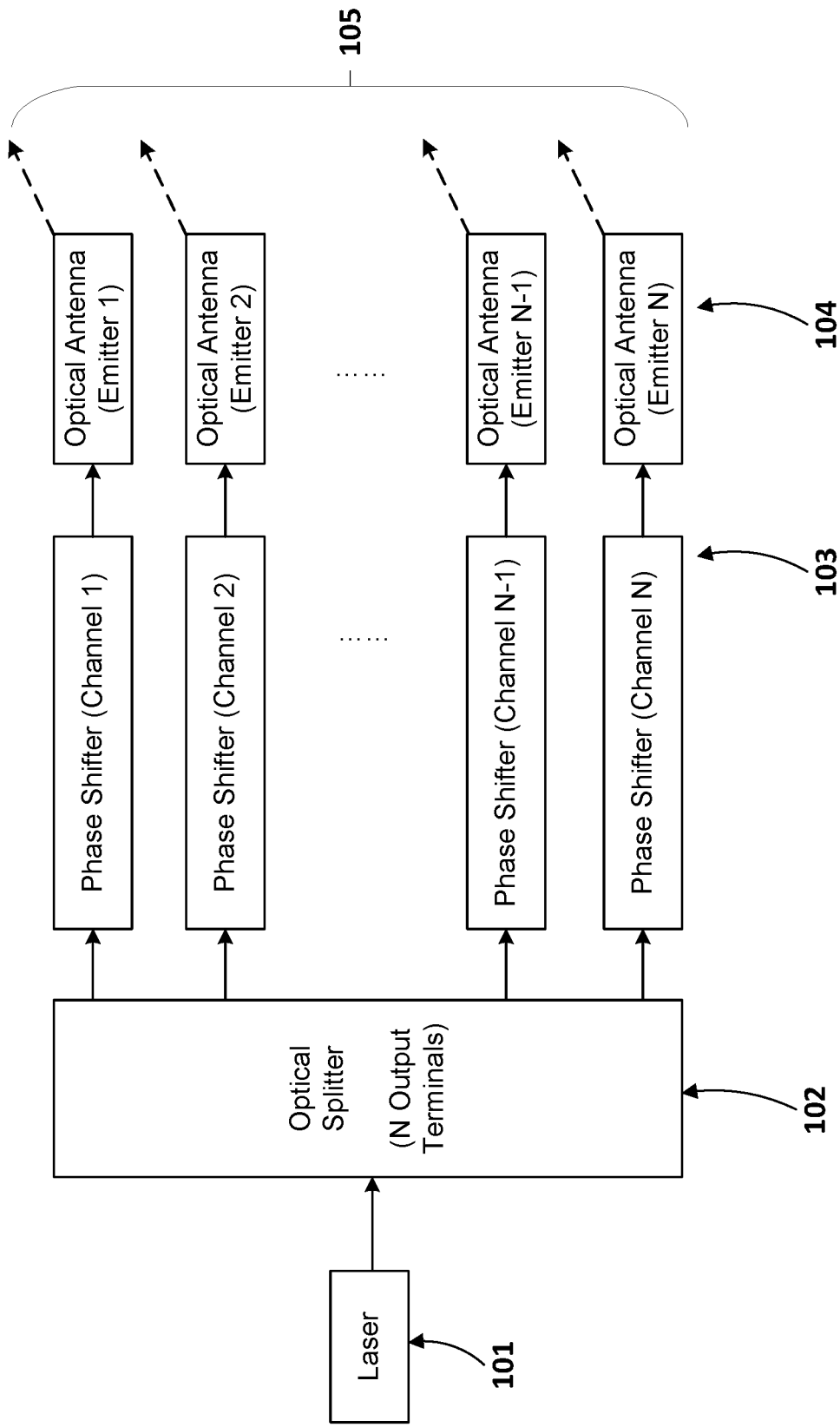
FIG. 1 illustrates a schematic diagram of an exemplary OPA transmitter 100, consistent with some disclosed embodiments.

FIG. 1 illustrates a schematic diagram of an exemplary OPA transmitter 100, consistent with some disclosed embodiments. OPA transmitter 100 is a key component of a solid-state lidar system, as it provides phased laser light beams to the outside of the lidar system so that the light beams can interfere with each other and form a far-field pattern. The light may be projected onto objects to be detected in the environment. OPA transmitter 100 according to the current embodiments may be a PIC manufactured by semiconductor fabrication technology (e.g., CMOS manufacturing technology). A PIC is a type of integrated circuit that has two or more photonic functions. For example, OPA transmitter 100 may be able to generate laser light, split the laser light into different channels, shift the phase of the split laser light, or emit the laser light to the outside of OPA transmitter 100.

Consistent with some embodiments of the present disclosure, OPA transmitter 100 may include a light source, for example, a laser 101. Laser 101 may be fabricated on the same PIC chip as other components of OPA transmitter 100, or alternatively may be provided from a source external to the PIC chip through a guiding channel. Laser 101 may emit laser light through optical amplification based on stimulated emission of electromagnetic radiation. Preferably, laser 101 according to the embodiments of the present disclosure may be a semiconductor laser, which generates a laser beam at the junction of a laser diode when an electron, driven by voltage, drops from a higher energy level to a lower one and recombines with a hole, thus generating radiation in the form of an emitted photon.

The laser light generated from laser 101 is not necessarily limited to visual spectrum, the wavelength of which typically ranges from 380 to 740 nm. Rather, since the current semiconductor lasers may generate laser beams with wavelengths ranging from infrared to ultraviolet spectrum, laser 101 according to the present disclosure may provide laser light in a much wider spectrum than visual spectrum, for example, with wavelengths approximately from 200 to 3,000 nm. Thus, the wider spectrum of the emitted laser light permits design flexibility of the lidar and, in some instances, reduces side effects on humans. For example, infrared light with a wavelength approximately between 1400 and 1800 nm is safe to eyes because it is difficult to be absorbed by eyes. Infrared light is also feasible for high power operation. The longer the wavelength of a laser beam is, the less demanding the semiconductor manufacturing technology is required, since many device parameters are proportional to the wavelength of the laser beam passing through. However, laser light with a wavelength above 3,000 nm may cause cornea damage in extreme conditions and thus may not be ideal for autonomous driving where the beam constantly reaches pedestrians and other drivers. On the other hand, laser light with wavelength below approximately 200 nm may require a shrunk device size for subsequent components of the lidar, including, for example, waveguide, which may be very costly or difficult to manufacture given the current state of semiconductor fabrication technology. However, this should not preclude a person of ordinary skill in the art from applying the gist of the current disclosure to future products compatible with higher or lower wavelength than the above range, when the manufacturing process advances to the point that the above issues may be attenuated or eliminated.

As used herein, the term "approximately" indicates the value of a given quantity that can vary based on a particular technology node associated with the subject semiconductor device. Based on the particular technology node, the term "approximately" can indicate a value of a given quantity that varies within, for example, 5-30% of the value (e.g., ±5%, ±10%, ±20%, or ±30% of the value).

Consistent with some embodiments of the present disclosure, OPA transmitter 100 may include an optical splitter 102. Optical splitter 102 may be optically coupled to laser 101. "Optically coupled to" or "optical coupling to" according to the present disclosure has the meaning that there is a flow of light (including but not limited to ultraviolet light, visible light, and infrared light) between two or more components when they are connected by a path permeable to electromagnetic waves.

Optical splitter 102 may split the input of one laser beam into N laser beams for phase shifting, where N is equal to or larger than two. Beam splitting is an important operation in a lidar system, because the multiple beams may interfere with each other after being phase shifted and emitted into the environment and, as a result, form a new beam pattern with directionality that can be projected as a highly concentrated beam onto objects for reflection and reception. Examples of optical splitter 102 according to the current embodiments include a star coupler, a multimode interference ("MMI") coupler tree, etc. A star coupler may have at least one input terminal and multiple output terminals. Each input terminal corresponds to N output terminals, where N is usually a power of 2 so that the split beams may be equally divided and thus have the same characteristics. An MMI coupler tree may excel in obtaining uniform phase delay for laser beams but is generally more complicated to manufacture on the PIC chip than a star coupler.

In some embodiments, optical splitter 102 may be provided on the same chip as other downstream components of the PIC chip, which include phase shifters, emitters, etc. In other embodiments, optical splitter 102 may be provided on the same chip as laser 101, which may be integrated with or separate from the chip that contains those downstream components.

Consistent with some embodiments of the present disclosure, OPA transmitter 100 may have a phase shifter 103 with two or more channels. Phase shifter 103 may be optically coupled to optical splitter 102. Assuming there are N output terminals from optical splitter 102, the number of channels of phase shifter 103 may be preferably designed to be equal to the number of output terminals, that is, N as well, with each channel dedicated to one split beam for phase shifting. In some embodiments, phase shifters 103 may have 2, 4, 8, 16, 32, 64, 128, 256, 512, or 1024 channels, all of which are a power of 2. Each channel may shift the phase of one split beam by a predetermined degree, so that multiple beams may interfere with each other after being emitted from the lidar and consequently form predictable far-field patterns. Phase shifter 103 may be preferably provided on the PIC chip as emitters to reduce loss of power when laser beams are transmitted from phase shifters to the emitters.

Interference occurs when two or more electromagnetic waves (e.g., laser light according to the present disclosure) superpose to form a new wave. When the original waves come from the same source or have the same or nearly the same frequency, the superposed new wave may result in constructive or destructive interference, depending on the phase difference. Constructive interference occurs when the amplitude of the combined new wave is larger than those of the original waves, thus creating a more powerful wave. In contrast, deconstructive interference generates a combined new wave of smaller amplitude than those of the original waves, thus creating a less powerful wave. For example, when the phase difference between two superposed waves is an even multiple of 180° (or $\pi$), constructive interference is at the peak level; when the phase difference is an odd multiple of 180° (or $\pi$), destructive interference is at the peak level (namely, the smallest amplitude after interference). In the present disclosure, constructive interference of emitted laser beams is more preferable than destructive interference in that it enhances the lidar detection range and makes it easy for the lidar receiver to capture the reflected light.

In some preferred embodiments, phase shifter 103 may employ one or more tunable phase shifters. A tunable phase shifter allows the designer or user of the lidar system to fine tune the amount of shifted phase among the array of split laser beams in order to control directionality and far-field patterns of the superposed beam emitted from the lidar. The tuning can be achieved and optimized by software programming, for example, using simulation algorithms to imitate the real-world results of the interferograms (i.e., images or graphs projected onto an object with a distance as a result of the interference). One example of the software is MATLAB (e.g. v9.5) developed by MathWorks. System electronics (not shown in FIG. 1) may be needed to electronically control the phase shifting of phase shifter 103. Such system electronics can be provided on the same PIC chip as phase shifter 103 with known semiconductor manufacturing technology (e.g., CMOS manufacturing process) and thus will not be further described herein.

Consistent with some embodiments of the present disclosure, OPA transmitter 100 may have an optical antenna 104 with one or more emitters. Optical antenna 104 may be optically coupled to phase shifter 103. Assuming there are N channels of phase shifter 103, the number of emitters of optical antenna 104 may be preferably designed to be equal to the number of channels of phase shifter 103, that is, N as well, with each emitter dedicated to one split beam for transmission. Similar to phase shifter 103, optical antenna 104 may be formed by semiconductor manufacturing technology (e.g., CMOS manufacturing technology).

Since optical splitter 102, phase shifter 103, and optical antenna 104 collectively form an arrayed optical device that controls the phase and amplitude of light beams 105 being emitted outside a lidar system, they may be together referred to as an "optical phased array device" according to the current disclosure. Once optically coupled to laser 101, the optical phased array device may become OPA transmitter 100 already described above.

Figure 2:
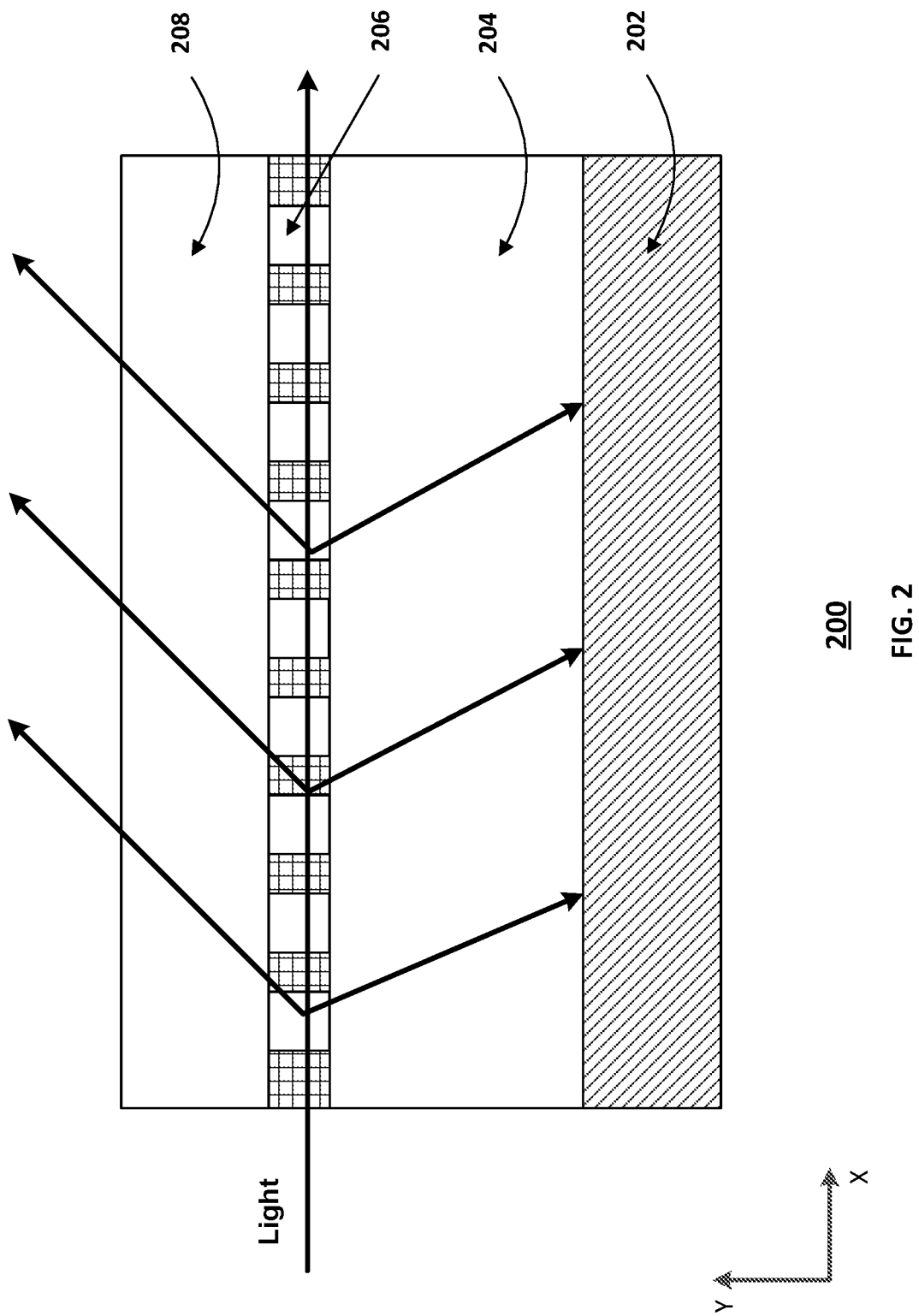
FIG. 2 illustrates a cross-section view of an existing optical antenna 200.

FIG. 2 illustrates a cross-section view of an existing optical antenna 200. Optical antenna 200 is designed on a semiconductor chip and capable of transmitting light to the outside environment. For ease of reference, two directions, x-direction and y-direction, are identified in FIG. 2 to further illustrate the spatial relationship of the components in optical antenna 200. Optical antenna 200 comprises four layers 202, 204, 206, and 208 extending in the x-direction (i.e., the lateral direction) and stacked vertically in the y-direction (i.e., the vertical direction). As used herein, whether one component (e.g., an element, a layer, or a device) is "on," "above," or "below" another component (e.g., an element, a layer, or a device) of a semiconductor device (e.g., an optical antenna), or whether the light is emitted "up," "upward," "upwards," "down," "downward," or "downwards" from a component (e.g., an element, a layer, or a device) is determined relative to the substrate of the semiconductor device (e.g., substrate 202, to be discussed below) in the y-direction (i.e., the vertical direction) when the substrate is positioned in the lowest plane of the semiconductor device in the y-direction. The same notion for describing the spatial relationship is applied throughout the present disclosure.

Optical antenna 200 includes a substrate 202 at its bottom. Substrate 202 is made of silicon. Above that is disposed a buried oxide layer 204. Buried oxide layer 204 is made of silicon dioxide, also known as silica. Such a stacking composition of one silicon layer and one silicon dioxide layer has been adopted by the lidar developers in the industry in constructing a photonic semiconductor system, known as a silicon-on-insulator ("SOT") architecture. Optical antenna 200 further includes a waveguide layer 206 and a cladding layer 208 on top of waveguide layer 206. One function of cladding layer 208 is to protect the inner structure of optical antenna 200. Waveguide layer 206, as its name suggests, guides the light transmitted from other components of the lidar system and emits it to the environment. Waveguide layer 206 is interposed with a grating array that deflects the light upwards and downwards from waveguide layer 206.

The problem of the existing design of optical antenna 200 is its high intrinsic loss of energy when light is emitted. The loss, which may be 3 dB or more, mainly results from the downward emitting light absorbed by or passing through substrate 202. As a result, the lidar system is unable to use that downward emitting light for light interference and projection. Therefore, a solution is needed to improve the efficiency of the optical antenna used in the lidar system, preferably along with a simple manufacturing process.

Figure 3:
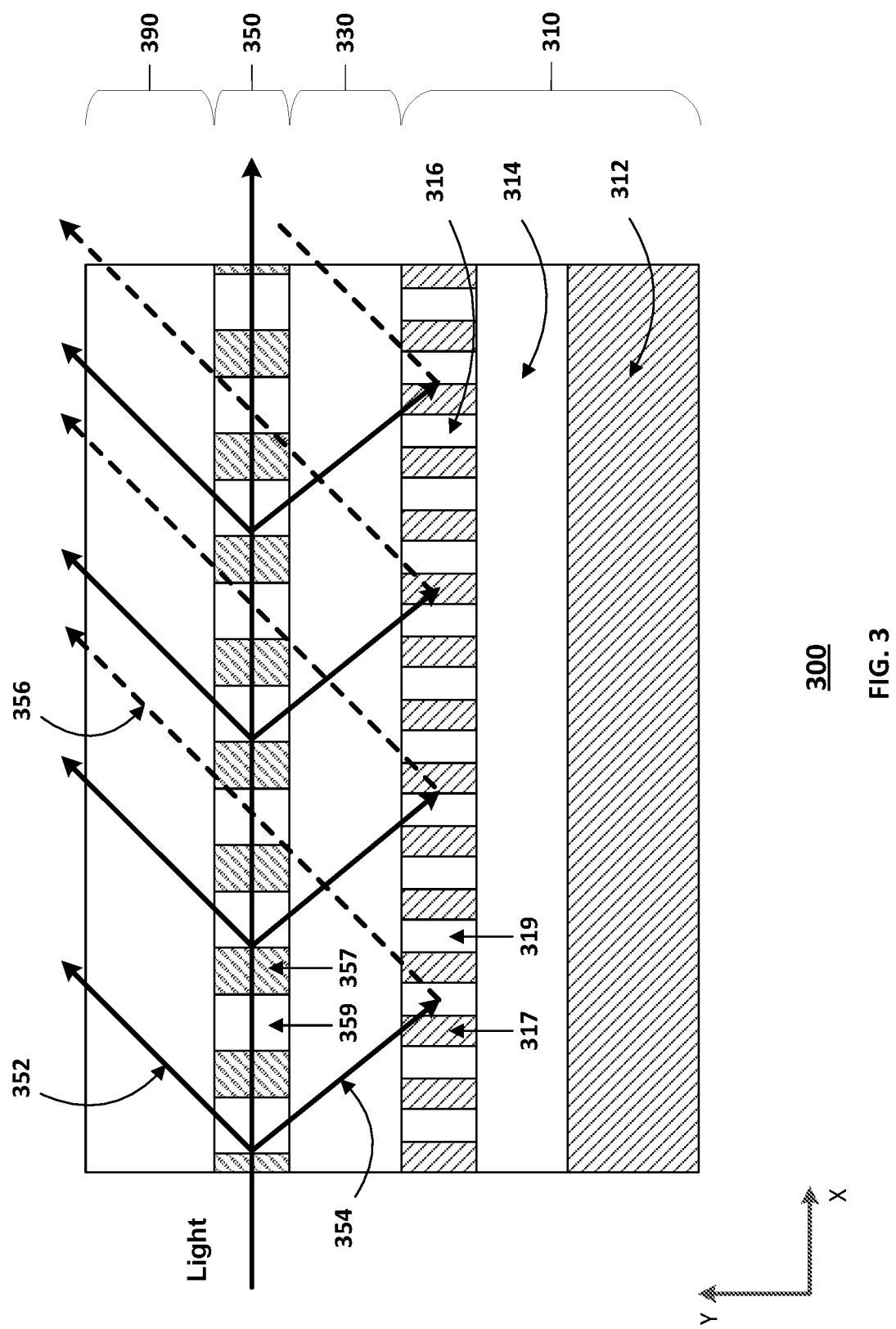
FIG. 3 illustrates a cross-section view of an optical antenna 300, consistent with some disclosed embodiments.

FIG. 3 illustrates a cross-section view of an optical antenna 300, consistent with some disclosed embodiments. Optical antenna 300 is a chip-scale semiconductor device (e.g., PIC) used in a lidar system for light transmission. It may be optically coupled to other components on the device, such as an optical splitter and a phase shifter described in conjunction with FIG. 1 above. In some embodiments, optical antenna 300 may have the same number of emitters as that of the channels of the phase shifter, with each emitter corresponding to a channel of the phase shifter. Under this configuration, each emitter of optical antenna 300 receives one split beam of laser light transmitted through a corresponding channel of the phase shifter.

It is noted that FIG. 3 only illustrates the cross-section view of the internal components of one emitter of optical antenna 300. In some preferred embodiments, the plurality of emitters of optical antenna 300 may have the same composition as the illustrated emitter, all of which extend laterally (along the x-direction) on a plane (not shown) of the PIC. The plane is perpendicular to the y-direction. The emitters of optical antenna 300 may be parallel or almost parallel to each other along the x-direction to avoid crosstalk between different emitters. Crosstalk occurs when the signal being transmitted in one channel is affected by signals from adjacent channels, usually caused by capacitive, inductive, or conductive coupling. In order to further reduce crosstalk, the channel pitch $d_p$ (i.e., the distance between two adjacent emitters) may be designed to be larger than the wavelength $\lambda$ of the transmitted light beam. In one non-limiting example, $d_p$ may be between approximately 0.5λ and 5λ while λ ranges from approximately 0.8 μm to 1.8 μm. The optical antenna may have a length l of approximately 0.1 mm to 10 mm, depending on the applications and manufacturing technology used.

According to some embodiments of the present disclosure, optical antenna 300 may include a reflector layer 310, a waveguide layer 350 disposed above reflector layer 310, and a separation layer 330 disposed between reflector layer 310 and waveguide layer 350. Reflector layer 310 is able to reflect light 354 emitted downwards from waveguide layer 350, thus reducing energy loss caused by undesired dispersion of light and increasing intensity of light 352 emitted upwards from optical antenna 300. A lidar system using the optical antenna according to the present disclosure may have enhanced emission efficiency and longer range of detection, as compared to a conventional lidar system using the same light source.

Waveguide layer 350 according to the present disclosure has two major roles—guiding light through optical antenna 300 while also emitting light to the outside of optical antenna 300. Waveguide layer 350 may have a thickness of 100 to 1,000 nm along the y-direction. It may include one or more of silicon, polysilicon, silicon nitride, or other high-refractive-index materials (at least higher than silicon dioxide). The adoption of materials with a higher refractive index than those making up the layers surrounding waveguide layer 350 makes it possible to reflect more light back to waveguide layer 350 than vice versa (i.e., using materials with a lower refractive index for waveguide layer 350) and, under certain conditions, to guide light within waveguide layer 350 by total internal reflection. Total internal reflection occurs when an incident ray of a wave (e.g., light) surpasses a critical angle $\theta_c$ on the interface between two media (normally from a high-refractive-index medium to a low-refractive-index medium) so that the entire ray is reflected back to the high-refractive-index medium. The critical angle $\theta_c$ may be calculated by Equation (1) below.

$$\theta_c = \sin^{-1}\frac{n_2}{n_1}$$ Eq. (1)

wherein $n_2$ is the refractive index of the second medium, $n_1$ is that of the first medium, and $n_2 \leq n_1$. Refractive indices of some exemplary materials applicable to the present disclosure are listed in Table 1 below.

TABLE 1

| Approximate Refractive Indices of Applicable Materials | |
|---|---|
| Material | Refractive Index |
| Polysilicon | 3.9 |
| Silicon | 3.6 |
| Silicon nitride | 2 |
| Silicon dioxide | 1.5 |
| Polymers (various) | 1.3-1.7 |

It is noted that the values of the indices of each material may vary depending on the measurement method and the wavelength of the electromagnetic wave. Thus, the refractive indices above are approximate values. A person of ordinary skill in the art would know how to measure the true value of the refractive index between two selected media for an electromagnetic wave with predetermined wavelength λ through a limited number of experiments.

An isotropic waveguide layer may emit light upwards through partial refraction. However, the partially refracted light often falls far short of the intensity needed to form a far-field pattern (e.g., light spot). Thus, a grating array is interposed in the waveguide layer to enhance light emission. According to some embodiments of the present disclosure, waveguide layer 350 may include a periodic grating array having a plurality of grates 359 interposed between waveguide materials 357, as shown in FIG. 3. Grates 359 may be made of silicon dioxide or other similar materials having a lower refractive index than that of waveguide materials 357, which can be one or more of silicon, polysilicon, silicon nitride, or other high-refractive-index materials (at least higher than silicon dioxide). The grating array may be formed by an etching process, where a uniform waveguide layer is first formed by chemical deposition, then etched with masks covering the waveguide materials, and the etched holes are filled in afterwards by the material of the grates. By controlling the pitch (that is, the average combined width of one grate 359 and one waveguide material 357) and duty cycle (that is, ratio of the average width of one grate 359 on one direction as compared to the pitch on the same direction) of the grating array, one may design waveguide layer 350 to obtain a desired angle of emitting light beams and improved emission efficiency.

A non-limiting example according to the current disclosure provides a grating array with a pitch of 0.5λ to λ and a duty cycle of 0.4 to 0.6 for waveguide layer 350, where λ is the wavelength of the split light beam. Since the wavelength λ according to the current disclosure ranges approximately between 800 and 1,800 nm, the pitch may range approximately between 400 and 1,800 nm. It is noted that the pitch and duty cycle of each pair of grate and waveguide material may not necessarily be uniform across the entire length of waveguide layer 350. Other ranges of the pitch or the duty cycle may also be possible to repeat the present disclosure with substantially the same good result.

In some embodiments, reflector layer 310 may include a substrate 312 and a buried oxide layer 314 above substrate 312. Substrate 312 may include silicon as its material, and buried oxide layer 314 may include silicon dioxide, also known as silica, as its material. Such a composition is known as an SOI architecture and makes it easy for optical antenna makers to mass-produce based on commercially available wafers. It is noted that the materials of substrate 312 and buried oxide layer 314 are not limited to the above example. Other materials can be selected to achieve the same or similar result with the teaching of the present disclosure.

Reflector layer 310 may also include a reflector waveguide structure 316 according to some embodiments of the present disclosure. Reflector waveguide structure 316 may be disposed above buried oxide layer 314 while underneath waveguide layer 350. The main function of reflector waveguide structure 316 is to reflect the downwards emitted light 354 back towards the upper surface of optical antenna 300 as light 356, thus intensifying the light beams from the lidar system. In some preferred embodiments, reflector waveguide structure 316 may further have a periodic grating array having a plurality of grates 319 interposed between reflector waveguide materials 317. The embodiment shown in FIG. 3 has a spaced alignment of grates and waveguide materials along x-direction. Grates 319 may be made of silicon dioxide or other similar materials having a lower refractive index than that of reflector waveguide materials 317, which can be one or more of silicon, polysilicon, silicon nitride, or other high-refractive-index materials (at least higher than silicon dioxide). Similar to waveguide layer 350, by controlling the pitch and duty cycle of the grating array, reflector waveguide structure 316 may be designed to adjust the angle of light beams being reflected back upwards, so that the emission efficiency of optical antenna 300 may be improved.

A non-limiting example according to the current disclosure provides a grating array with a pitch of 0.25λ to 0.75λ and a duty cycle of 0.3 to 0.7 in the reflector waveguide structure, where λ is the wavelength of the split light beam. Since the wavelength λ according to the current disclosure ranges approximately between 800 and 1,800 nm, the pitch may range approximately between 200 and 1,350 nm. It is noted that the pitch and duty cycle of each pair of grate and waveguide material may not necessarily be uniform across the entire length of reflector waveguide structure 316. Other ranges of the pitch or the duty cycle may also be possible to repeat the present disclosure with substantially the same good result.

In some embodiments, separation layer 330 may be a thin film lying above reflector layer 310 and extending laterally on a plane of the PIC, where the plane is perpendicular to the y-direction. Consistent with the current disclosure, the refractive index of the material of separation layer 330 is lower than that of waveguide material 357 of waveguide layer 350 and that of reflector waveguide material 317 of reflector layer 310. Thus, separation layer 330 may be made of one or more of silicon dioxide, or other low-refractive-index materials (at least lower than silicon nitride). Silicon dioxide used in separation layer 330 may be pure silicon dioxide or doped silicon dioxide. For example, silicon dioxide doped with fluorine may have a reduced refractive index than pure silicon dioxide.

According to some embodiments of the present disclosure, the thickness of separation layer 330 may be designed and manufactured to enhance the power and range of the light beams emitted from optical antenna 300. In particular, separation layer 330 may have a thickness that makes possible constructive interference between emitted light 352 and reflected light 356. This is because the thickness brings a path difference PD between the optical path length ("OPL") of emitted light 352 and that of reflected light 356, and thus may create a combined new beam with greater amplitude than the original beams when the two light beams constructively interfere with each other. Emitted light 352 and reflected light 356 have the same wavelength λ that originates from the light source (not shown in FIG. 3). When the path difference PD is equal to an even multiple of 180° (or π) multiplied by wavelength λ, the combined new beam may have the maximum amplitude under the condition of constructive interference, as illustrated by equation (2) below.

$$PD=2k\pi\lambda \qquad \text{Eq. (2)}$$

wherein k is 0, 1, 2, 3, . . . , n. In some applications where the maximum amplitude is not required, the path difference PD can be chosen to fall within a range that an enhanced amplitude (that is, larger than the single amplitude of emitted light 352 or reflected light 356) may be obtained. For example, the range may be from $(2k-\frac{1}{2})\pi\lambda$ to $(2k+\frac{1}{2})\pi\lambda$.

It is noted that the above calculation of the thickness of separation layer 330 may not have taken into account some factors that may also affect the phase variation between emitted light 352 and reflected light 356. For example, the incident angle and reflective angle of reflected light 356, the refractive index of separation layer 330 versions of FDTD or MODE application packages by Lumerical Inc.). Such applications may allow a person of ordinary skill in the art, with the teaching of the current disclosure, to find out the appropriate thickness (or a range of thickness) of separation layer 330 that would enhance the emission power of the lidar system at desired locations in the space. In one non-limiting example where the light has a wavelength of 1,550 nm, the thickness of separation layer 330 made of silicon dioxide may be approximately 1,500 nm according to the simulation result using the FDTD or MODE application packages.

In some further embodiments, optical antenna 300 may additionally include a cladding layer 390 disposed above waveguide layer 350. Cladding layer 390 may protect the main components of optical antenna 300, namely, waveguide layer 350, separation layer 330, and reflector layer 310, from being exposed directly to corrosion or damage. It may also serve as a light-transmitting layer that allows emission of light from underneath. Therefore, the material of cladding layer 390 may be selected to be transparent to the emitted light of a particular wavelength k, which in turn is the wavelength of the light source in the lidar system. For example, silicon dioxide is sufficiently transparent as to light with a wavelength of 1,550 nm, which thus can be used as the material of cladding layer 390 when the lidar light source generates light of a 1,550 nm wavelength. In another example, cladding layer 390 may be made of a polymer material, an example of which is benzocyclobutene (BCB). As illustrated in Table 1, the refractive indices of silicon dioxide and polymer materials are both smaller than that of waveguide materials 357, which can be one or more of silicon, polysilicon, silicon nitride, or other high-refractive-index materials (at least higher than silicon dioxide).

Figure 4:
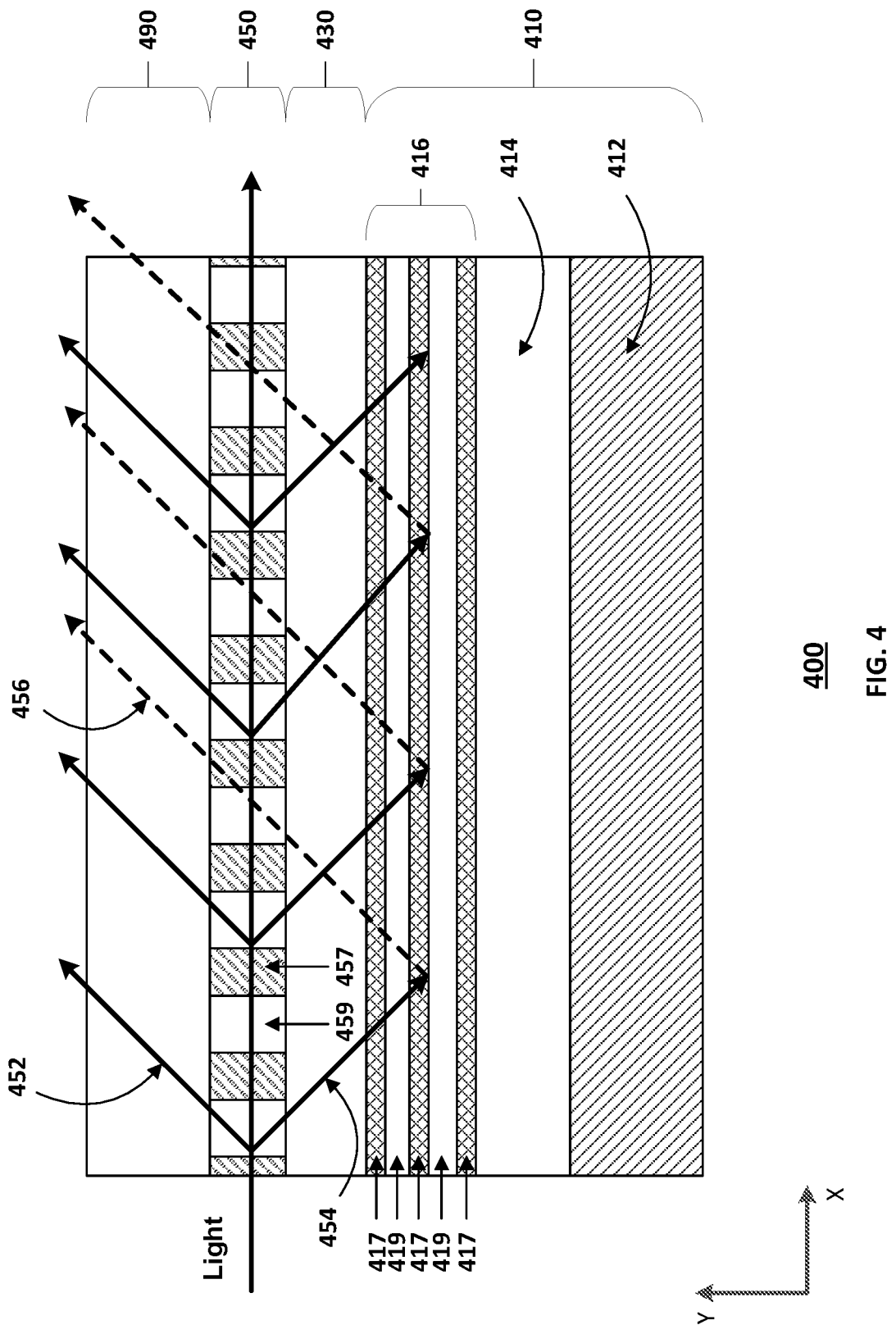
FIG. 4 illustrates a cross-section view of an optical antenna 400, consistent with some disclosed embodiments.

FIG. 4 illustrates a cross-section view of an optical antenna 400, consistent with some disclosed embodiments. Optical antenna 400 has generally the same or similar components, design, and functionality as optical antenna 300 except one major difference, which will be described below.

Provided as a chip-scale semiconductor device, optical antenna 400 may be optically coupled to other components (e.g., optical splitter, phase shifter, etc.) and receive split light beams to be further emitted to the outside of the lidar system. As shown in FIG. 4, optical antenna 400 may likewise include a reflector layer 410, a waveguide layer 450 disposed above reflector layer 410, and a separation layer 430 disposed between reflector layer 410 and waveguide layer 450. Waveguide layer 450 may have a periodic grating array having a plurality of grates 459 interposed between waveguide materials 457 and deflect the input light beam upwards as light 452 and downwards as light 454. Reflector layer 410 may include a substrate 412, a buried oxide layer 414 above substrate 412, and a reflector waveguide structure 416 above buried oxide layer 414. Reflector waveguide structure 416 may reflect light 454 back towards the upper surface of optical antenna 400 as light 456, thus intensifying the light beams from the lidar system when light 456 constructively interferes with light 452. Similar to separation layer 330 of optical antenna 300, separation layer 430 may have a thickness that makes possible constructive interference between emitted light 452 and reflected light 456. The calculation and simulation approaches regarding the thickness of separation layer 330 described above in conjunction with FIG. 3 and its embodiments may be similarly applied to separation layer 430. Optical antenna 400 may additionally have a cladding layer 490 disposed above waveguide layer 450. The materials of the abovementioned components with numerical references in FIG. 4 may be the same as those of similarly numbered components in optical antenna 300, as described in conjunction with FIG. 3.

Optical antenna 400 differs from optical antenna 300 primarily with respect to the reflector waveguide structure of the reflector layer. As discussed above, reflector waveguide structure 316 in optical antenna 300 has a spaced alignment of grates 319 and reflector waveguide materials 317 along x-direction. In contrast, reflector waveguide structure 416 in optical antenna 400 has a spaced alignment of grates and waveguide materials along y-direction. More specifically, reflector waveguide structure 416 may have a periodic grating array having a plurality of grates 419 interposed between reflector waveguide materials 417, with each grate 419 and each waveguide material 417 being a thin film stacked vertically above each other, as shown in FIG. 4. The vertically stacked grating array of reflector waveguide structure 416 may be formed by sequential chemical deposition of thin films of waveguide materials 417 and grates 419, in a reciprocally interposed fashion. This manufacturing process differs from the etching process used in forming the periodic grating array in optical antenna 300. Grates 419 may be made of silicon dioxide or other similar materials having a lower refractive index than that of reflector waveguide materials 417, which can be one or more of silicon, polysilicon, silicon nitride, or other high-refractive-index materials (at least higher than silicon dioxide). Thus, light 454 may be partially or totally reflected back from the interfaces between reflector waveguide materials 417 and grates 419. The total reflection occurs when the incident angle of light 454 is larger than the critical angle $\theta_c$. Similar to waveguide layer 450, by controlling the pitch and duty cycle of the grating array, reflector waveguide structure 416 may be designed to adjust the angle of light beams being reflected back upwards as well as to improve the emission efficiency.

According to one example of the current disclosure, reflector waveguide structure 416 may have three layers of reflector waveguide materials 417 and two layers of grates 419. The thickness of each layer of reflector waveguide materials 417 is between 50 nm and 500 nm, and that of each layer of grates 419 is between 50 nm and 500 nm. A person of ordinary skill in the art, with the teaching of the current disclosure, may use simulation software applications (e.g., latest versions of FDTD or MODE application packages by Lumerical Inc.) to design the appropriate number of layers of reflector waveguide materials 417 and grates 419, respectively, and appropriate thickness (or a range of thickness) of each layer of reflector waveguide materials 417 and grates 419.

Figure 5:
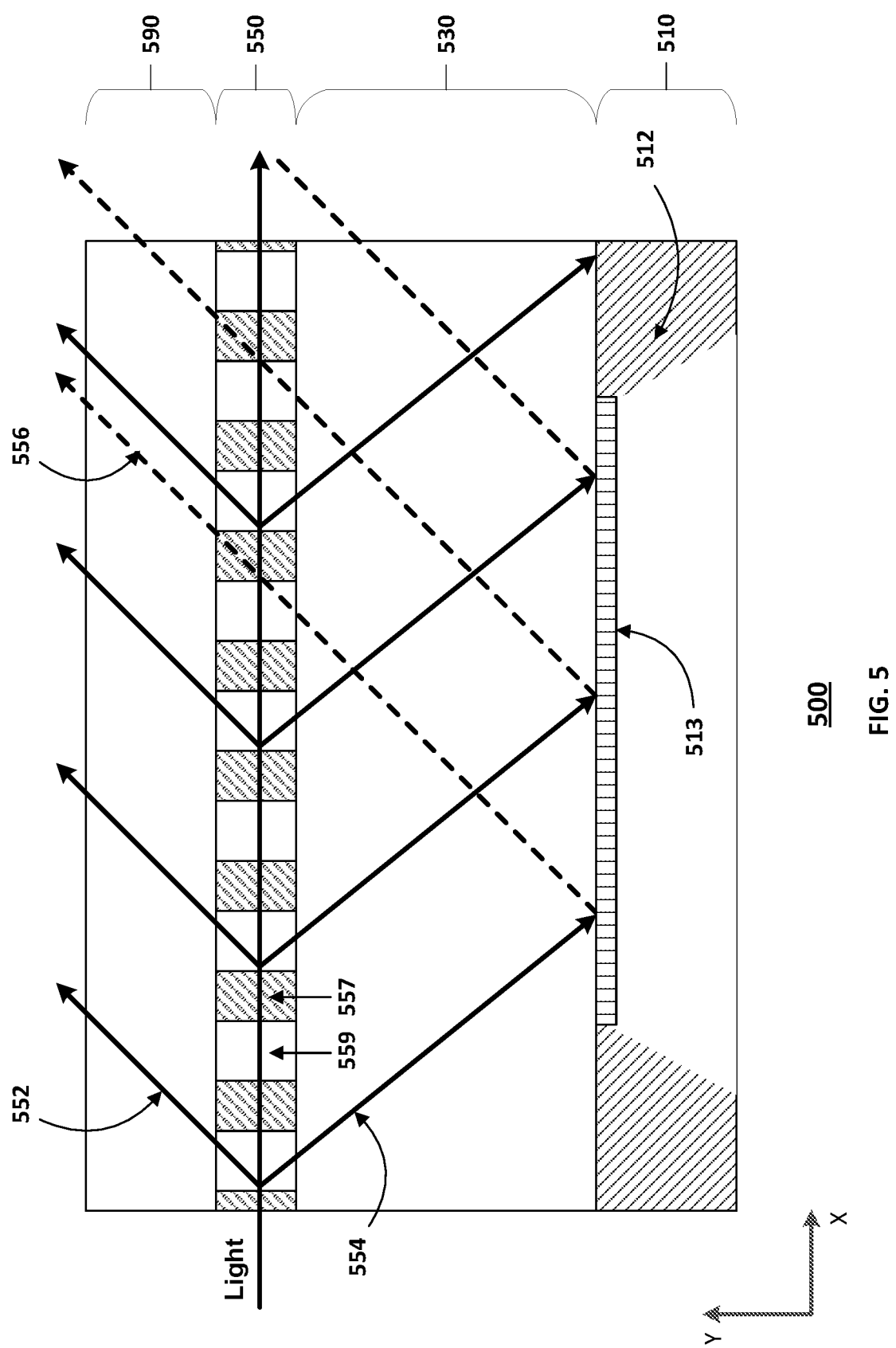
FIG. 5 illustrates a cross-section view of an optical antenna 500, consistent with some disclosed embodiments.

FIG. 5 illustrates a cross-section view of an optical antenna 500, consistent with some disclosed embodiments. Similar to optical antennas 300 and 400, optical antenna 500 according to the current disclosure may include a reflector layer 510, a waveguide layer 550 disposed above reflector layer 510, and a separation layer 530 disposed between reflector layer 510 and waveguide layer 550. Waveguide layer 550 may have a periodic grating array having a plurality of grates 559 interposed between waveguide materials 557 and deflect the input light beam upwards as light 552 and downwards as light 554.

According to some embodiments consistent with the current disclosure, reflector layer 510 of optical antenna 500 may include a substrate 512 and a metallic reflector sheet 513. The material of metallic reflector sheet 513 may include one or more of gold, silver, aluminum, or other metal or alloy capable of reflecting light 554 back to the upper surface of optical antenna 500 as light 556. Thus, reflector layer 510 has the same functionality as reflector layers 310 and 410 in previous embodiments despite having a different composition. Because metallic reflector sheet 513 may reflect light 554 without absorbing its energy, the emission efficiency of optical antenna 500 may surpass other embodiments where a grating array is used in the reflector layer. An exemplary manufacturing process of metallic reflector sheet 513 includes first etching a portion of substrate 512 from the bottom until reaching separation layer 530 and then forming a thin film of a metallic sheet by chemical deposition. As a result, the manufacturing process may be more complicated than that used in manufacturing a grating array in reflector layers 310 and 410.

Similar to separation layer 330 of optical antenna 300 and separation layer 430 of optical antenna 400, separation layer 530 may have a thickness that makes possible constructive interference between emitted light 552 and reflected light 556. The calculation and simulation approaches regarding the thickness of separation layer 330 described above in conjunction with FIG. 3 and its embodiments may be similarly applied to separation layer 530. Optical antenna 500 may additionally have a cladding layer 590 disposed above waveguide layer 550. The materials of the abovementioned components with numerical references in FIG. 5 may be the same as those of similarly numbered components in optical antennas 300 and 400, as described in conjunction with FIGS. 3 and 4.

Figure 6:
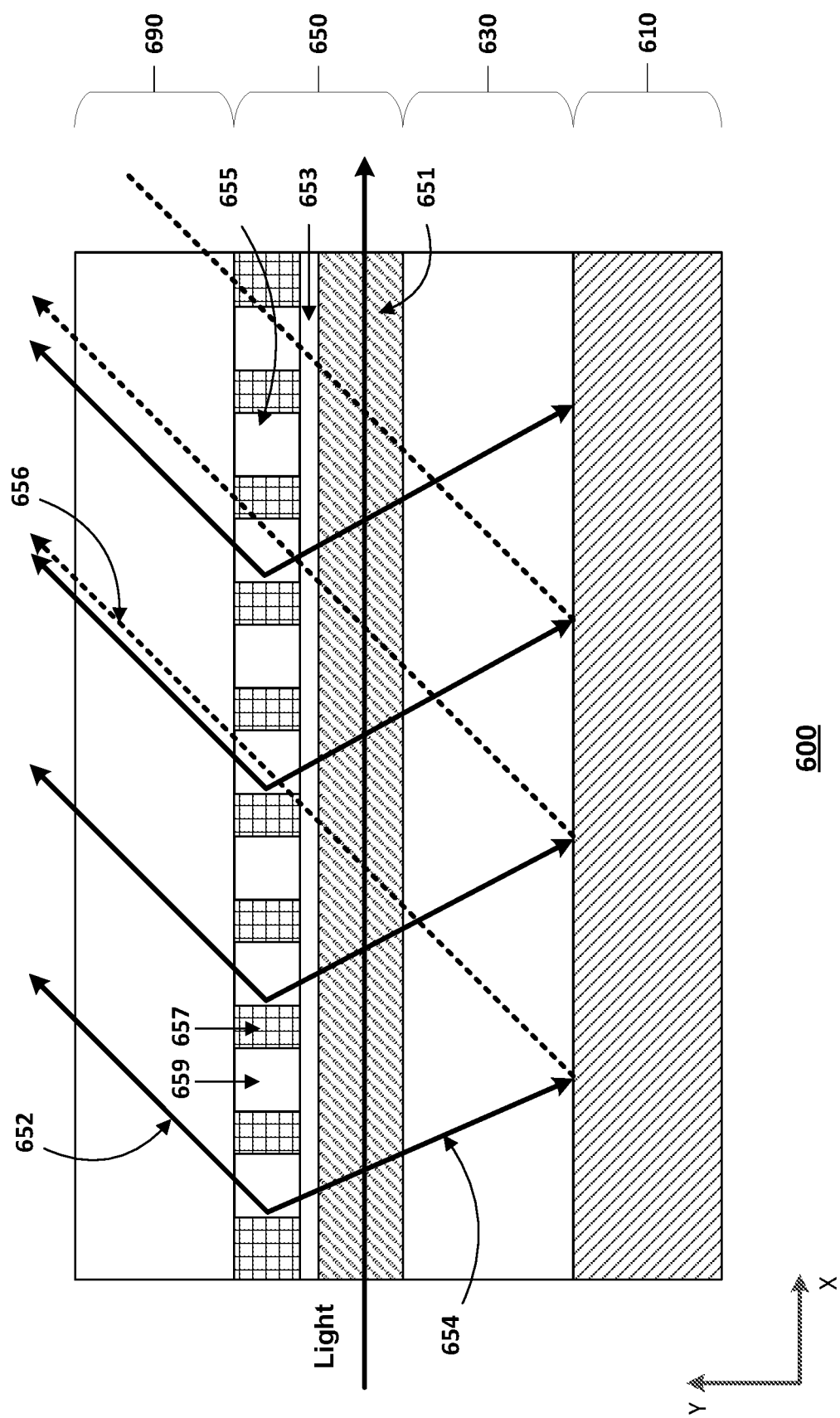
FIG. 6 illustrates a cross-section view of an optical antenna 600, consistent with some disclosed embodiments.

FIG. 6 illustrates a cross-section view of an optical antenna 600, consistent with some disclosed embodiments. Similar to optical antennas 300, 400, and 500, optical antenna 600 may likewise have a reflector layer 610, a waveguide layer 650 disposed above reflector layer 610, and a separation layer 630 disposed between reflector layer 610 and waveguide layer 650. Optical antenna 600 may additionally have a cladding layer 690 disposed above waveguide layer 650, which serves as a light-transmitting layer and can be made of one or more of silicon dioxide or polymer materials.

Although not shown in FIG. 6, the composition of reflector layer 610 may be the same as that of reflector layers 310, 410, or 510, as described above in conjunction with FIGS. 3, 4, and 5, respectively. In some embodiments, reflector layer 610 may include sub-layers that facilitate light reflection, such as a substrate, a buried oxide layer, a reflector waveguide structure (as that in optical antennas 300 or 400), a metallic reflector sheet (as that in optical antenna 500), etc. In other embodiments, reflector layer 610 may be uniformly formed by a substrate, which can be made of silicon or polysilicon, although the light reflection capability in these embodiments may not be as good as those with multiple sub-layers.

Consistent with some embodiments of the present disclosure, waveguide layer 650 of optical antenna 600 may have a waveguide sub-layer 651, a high-refractive-index layer 655 disposed above waveguide sub-layer 651, and a thin oxidized layer 653 disposed between waveguide sub-layer 651 and high-refractive-index layer 655, as shown in FIG. 6. Optical antenna 600 differs from existing technology and other embodiments described above in that coupling of light between two light-guiding layers (i.e., waveguide sub-layer 651 and high-refractive-index layer 655) is intentionally created, which contradicts the conventional notion of avoiding crosstalk. More specifically, split light beams received by optical antenna 600 can be transmitted by both waveguide sub-layer 651 and high-refractive-index layer 655, with a thin layer in between with a sub-wavelength thickness.

According to the current embodiments, waveguide sub-layer 651 may be a layer made of one or more of silicon, polysilicon, silicon nitride, or other high-refractive-index materials (at least higher than silicon dioxide). Unlike waveguide layers 350, 450, and 550 in previous embodiments, waveguide sub-layer 651 in FIG. 6 does not have a grating array. Since the materials of separation layer 630 and thin oxidized layer 653 are both of a refractive index lower than that of waveguide sub-layer 651, light can be confined and transmitted in waveguide sub-layer 651 through total internal reflection, thus reducing loss caused by unwanted scattering of light.

High-refractive-index layer 655 may have a composition similar to that of waveguide layers 350, 450, and 550. High-refractive-index layer 655 may have a periodic grating array having a plurality of grates 659 interposed between waveguide materials 657, as shown in FIG. 6. Grates 659 may be made of silicon dioxide or other similar materials having a lower refractive index than that of waveguide materials 657, which can be one or more of silicon, polysilicon, silicon nitride, or other high-refractive-index materials (at least higher than silicon dioxide). By controlling the pitch and duty cycle of the grating array, one may design waveguide layer 650 to obtain a desired angle of emitting light beams and improved emission efficiency. Consistent with these embodiments, a preferred range of pitch is approximately between 400 and 1,800 nm while a preferred range of duty cycle is approximately between 0.2 and 0.8.

Thin oxidized layer 653 in these embodiments may be designed to have a sub-wavelength thickness in order to allow coupling between the light transmitted by waveguide sub-layer 651 and the light transmitted by high-refractive-index layer 655. Thin oxidized layer 653 may be made of one or more of silicon dioxide, or other low-refractive-index materials (at least lower than silicon nitride). In some preferred embodiments, thin oxidized layer 653 may have a thickness approximately between 50 and 400 nm, which is less than half of the wavelengths of typical light sources in lidar systems, such as 905 nm or 1,550 nm. Thin oxidized layer 653 may be formed by a thermal oxidation process, which is performed under high temperature (typically between 800 and 1200° C.) with oxidizing agent added to, and reacting with, a silicon wafer in order to create an oxidized layer on its surface. The thermal oxidation process is a standard process in CMOS fabrication and thus simple and economic to be adopted with the current disclosure. When the light in high-refractive-index layer 655 and the light in waveguide sub-layer 651 couple with each other thanks to the proximity between these two layers, the intensity of light emitted from optical antenna 600 is increased. Such increase is controllable by designing the thickness of thin oxidized layer 653 with simulation software applications known in the lidar industry (e.g., latest versions of FDTD or MODE application packages by Lumerical Inc.). Similar to the case in designing separation layers 330, 430, and 530, such applications may allow a person of ordinary skill in the art, with the teaching of the current disclosure, to find out the appropriate thickness (or a range of thickness) of thin oxidized layer 653 that would enhance the emission power of the lidar system at desired locations in the space.

In some embodiments, the physical characteristics and material of separation layer 630 may be similar to separation layers 330, 430, and 530 described above. It may be made of one or more of silicon dioxide, or other low-refractive-index materials (at least lower than silicon nitride). Separation layer 630 may have a thickness that makes possible constructive interference between emitted light 652 and reflected light 656 (which is reflected from light 654 emitted downwards from waveguide layer 650). The calculation and simulation approaches regarding the thickness of separation layer 330 described above in conjunction with FIG. 3 and its embodiments may be similarly applied to separation layer 630.

Figure 7:
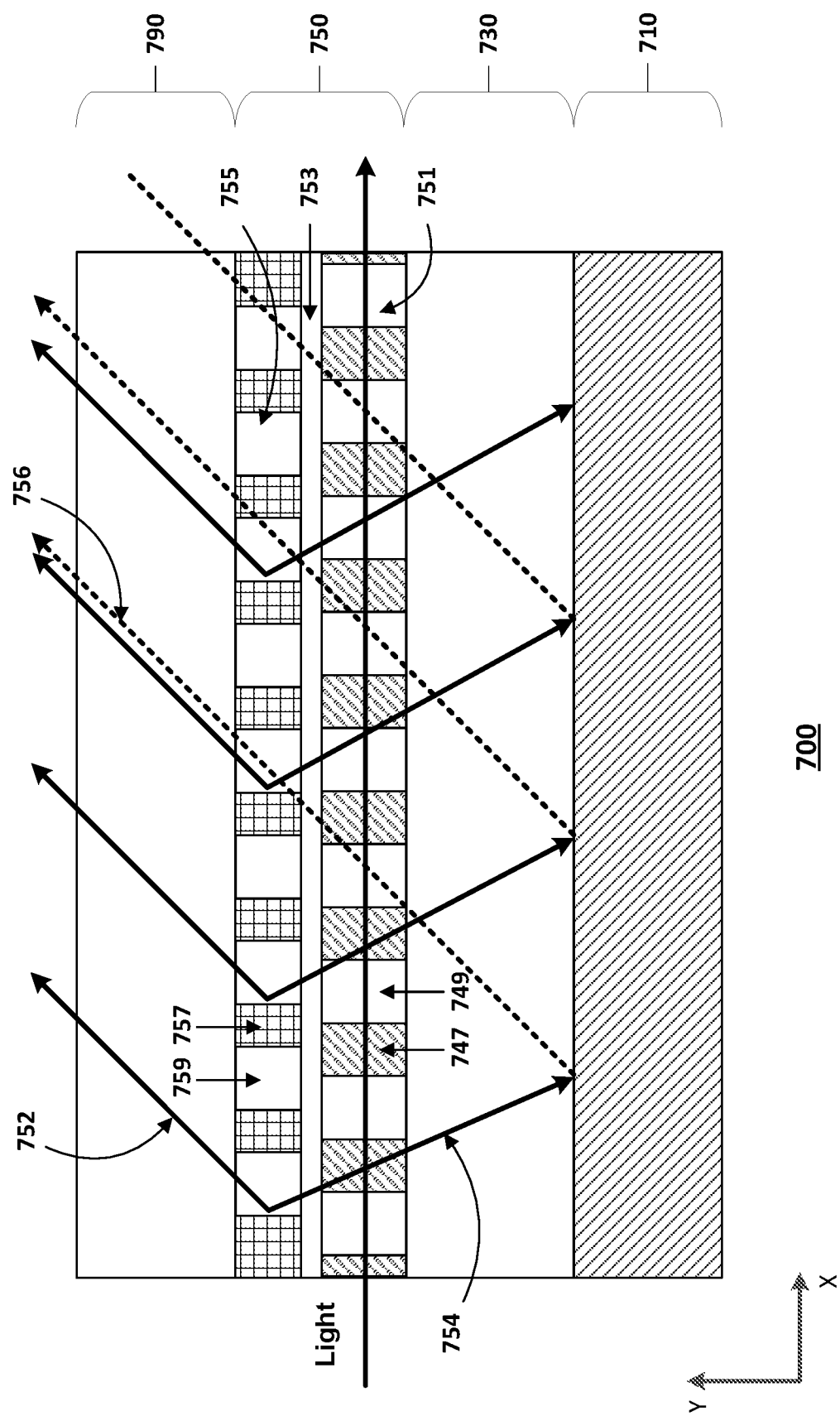
FIG. 7 illustrates a cross-section view of an optical antenna 700, consistent with some disclosed embodiments.

FIG. 7 illustrates a cross-section view of an optical antenna 700, consistent with some disclosed embodiments. Optical antenna 700 may have a reflector layer 710, a waveguide layer 750 disposed above reflector layer 710, and a separation layer 730 disposed between reflector layer 710 and waveguide layer 750. Waveguide layer 750 may further include a waveguide sub-layer 751, a high-refractive-index layer 755 disposed above waveguide sub-layer 751, and a thin oxidized layer 753 disposed between waveguide sub-layer 751 and high-refractive-index layer 755, as shown in FIG. 7. High-refractive-index layer 755 may have a periodic grating array having a plurality of grates 759 interposed between waveguide materials 757. Separation layer 730 may have a thickness that makes possible constructive interference between emitted light 752 and reflected light 756 (which is reflected from light 754 emitted downwards from waveguide layer 750). Optical antenna 700 may additionally have a cladding layer 790 disposed above waveguide layer 750, which serves as a light-transmitting layer and can be made of one or more of silicon dioxide or polymer materials. These components of optical antenna 700 may have the same or similar physical characteristics, design, and functionality as those with similar reference numbers of optical antenna 600 described above.

Optical antenna 700 differs from optical 600 primarily in that waveguide sub-layer 751 may further have a periodic grating array having a plurality of grates 749 interposed between waveguide materials 747. This composition is similar to the grating arrays in waveguide layers 350, 450, and 550 respectively in FIGS. 3, 4, and 5. By controlling the pitch and duty cycle of the grating arrays in both waveguide sub-layer 751 and high-refractive-index layer 755, one may design waveguide layer 750 to obtain a desired angle of emitting light beams and improved emission efficiency. Consistent with these embodiments, for high-refractive-index layer 755, a preferred range of pitch is approximately between 400 and 1,800 nm while a preferred range of duty cycle is approximately between 0.2 and 0.8; for waveguide sub-layer 751, a preferred range of pitch is approximately between 400 and 1,800 nm while a preferred range of duty cycle is approximately between 0.4 and 0.6. According to these embodiments, the emission efficiency may be further enhanced over the embodiments described in conjunction with FIG. 6, but the manufacturing process may be more complicated, and thus more expensive, partially caused by the additional grating array added into waveguide layer 750. A person of ordinary skill in the art would understand how to choose a design of the optical antenna that most properly fits his financial and functional needs.

Figure 8:
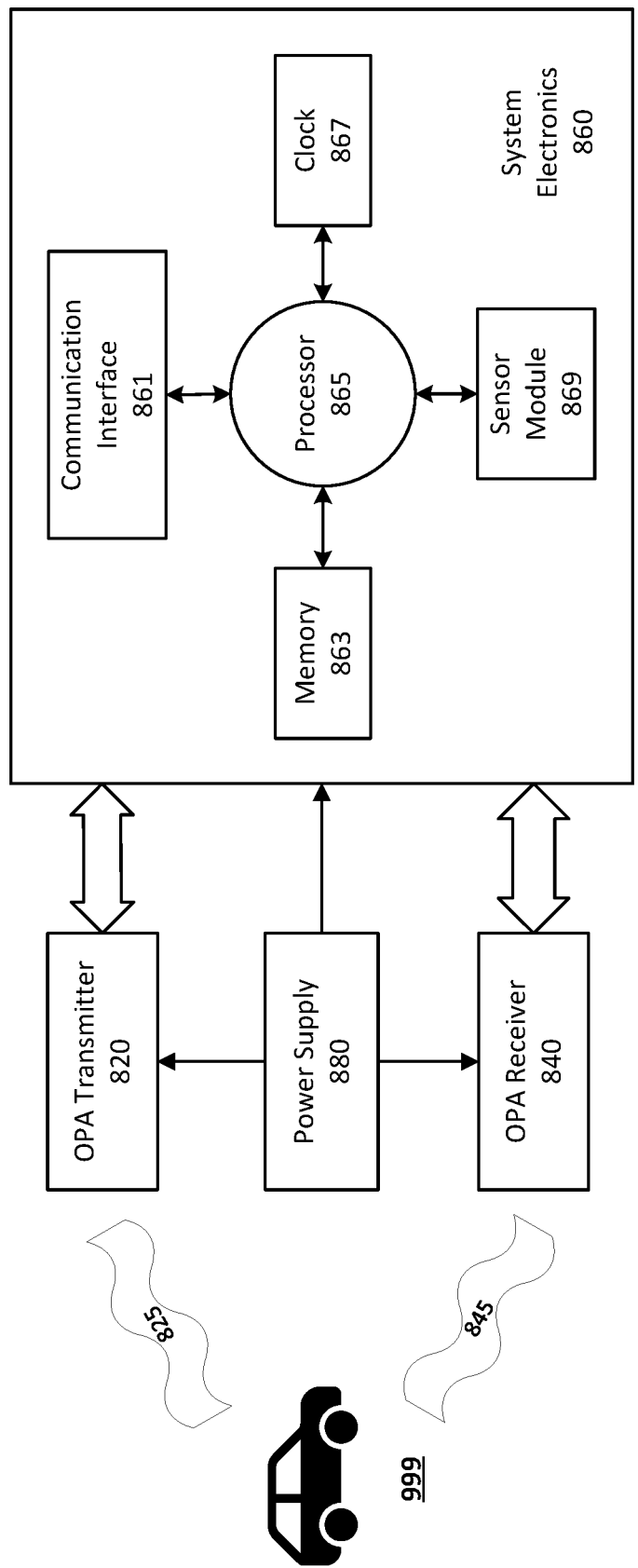
FIG. 8 illustrates a schematic diagram of an exemplary lidar system 800, consistent with some disclosed embodiments.

FIG. 8 illustrates a schematic diagram of an exemplary lidar system 800, consistent with some disclosed embodiments. Lidar system 800 may include an OPA transmitter 820, an OPA receiver 840, system electronics 860, and a power supply 880. OPA transmitter 820 may have the same configuration as the exemplary OPA transmitter 100 described above in conjunction with FIG. 1, which may incorporate one or more optical antennas having the same configuration as any one of the exemplary optical antennas 300, 400, 500, 600, and 700. In addition to the embodiments described above, OPA transmitter 820 according to some embodiments may further have a lens module that may include a global lens, a plurality of lenses, and/or an array of micro-lenses. The OPA transmitter may collimate the beams of light emitted from the plurality of emitters of the optical antenna, so that the emission efficiency may be improved accordingly.

After reaching an object 999 in the space, light 825 emitted from OPA transmitter 820 is bounded back as light 845 and subsequently captured by OPA receive 840. Consistent with some embodiments of the present disclosure, OPA receiver 840 may have an optical antenna that receives light 845. Because of the reciprocity theorem applicable to light transmission and reception, the optical antenna of OPA receiver 840 may have the same design and configuration as the transmitting optical antenna of OPA transmitter 820, which include, but not limited to, exemplary optical antennas 300, 400, 500, 600, and 700. An array of light capturing elements may also be provided in OPA receiver 840, such as photodiodes or other imaging sensors that may convert photons to electrical information. By subsequent assessment of the electrical information by other components of lidar system 800, the light capturing elements play the key function of detecting the existence, direction, and possibly strength, of light 845 bounced back from object 999 at a distance. OPA receiver 840 may further have a lens module that may include a global lens, a plurality of lenses, and/or an array of micro-lenses. The lens module may serve as a color filter, a natural light filter, and/or a light conversion lens that allows light to be more concentrated on each of the light capturing elements.

In some embodiments, system electronics 860 may include a communication interface 861, a memory 863, a processor 865, a clock 867, and a sensor module 869. Communication interface 861 is provided to transmit and receive data from OPA transmitter 820 or OPA receiver 840. Communication interface 861 may also exchange data with processor 865. Such data may include clock information, system control information, data stored in memory 863, etc.

In some embodiments, memory 863 may include any appropriate type of mass storage that stores any type of information that processor 865 may need to operate. Memory 863 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 863 may be configured to store one or more computer programs that may be executed by processor 865 to perform various functions of lidar system 800.

In some embodiments, processor 865 may include any appropriate type of general-purpose or special-purpose microprocessor, digital signal processor, or microcontroller. Processor 865 may be configured as a separate processor module dedicated to performing one or more specific functions. Alternatively, processor 865 may be configured as a shared processor module for performing other functions unrelated to the one or more specific functions.

In some embodiments, clock 867 may generate a clock signal that coordinates actions of the various components in lidar system 800, such as the phase shifter in OPA transmitter 820, processor 865, etc. With clock 867, system electronics 860 may calculate the phase shifts between adjacent emitters of the optical antenna in OPA transmitter 820, and store the clock information for subsequent reversal phase shifts when OPA receiver 840 receives bounced back light 845. Moreover, processor 865 may also calculate the distance between lidar system 800 and object 999 once knowing the relative moving speed and, with clock 867, the time of travel between transmission and emission.

In some embodiments, sensor module 869 may include one or more sensors that inform lidar system 800, and a movable vehicle if lidar system 800 is mounted thereon, of its speed, acceleration, geographical location, etc. Sensor module 869 is crucial to the implementation of an automatic ranging and detection lidar system as such information may be used by system electronics 860 to calculate and form a point cloud. The types of sensors that may be incorporated in sensor module 869 according to the current disclosure may include geolocation sensors (e.g., GPS sensor, Beidou sensor, and GlONASS sensor), inertial measurement unit ("IMU") sensors, speedometers, etc.

Power supply 880 provides electric power to various components in lidar system 800, including OPA transmitter 820, OPA receiver 840, and system electronics 860. In some embodiments, power supply 880 may be one or more batteries provided within lidar system 800. In other embodiments, power supply 880 may be an AC or DC current source external to lidar system 800.

According to one aspect of the present disclosure, an optical antenna for light transmission includes a substrate that forms at least a portion of a reflector layer, a waveguide layer disposed above the reflector layer, and a separation layer disposed between the waveguide layer and the reflector layer. The reflector layer includes a first material. The waveguide layer transmits light and includes a second material. The separation layer includes a third material. The waive guide layer further includes a first grating array. The reflector layer reflects the light emitted downwards from the waveguide layer. A refractive index of the third material is smaller than that of either the first material or the second material.

In some implementations, a wavelength of the light is in the range approximately between 200 and 3,000 nm.

In some implementations, a thickness of the separation layer is configured to cause constructive interference between the light emitted upwards from the waveguide layer and the light reflected upwards from the reflector layer.

In some implementations, the first grating array of the waveguide layer has a pitch in the range approximately between 400 and 1,800 nm.

In some implementations, the first grating array of the waveguide layer includes silicon dioxide formed by an etching process.

In some implementations, the third material includes one or more of silicon dioxide, or a material having a refractive index lower than that of silicon nitride.

In some implementations, the first material and the second material each includes one or more of silicon, polysilicon, silicon nitride, or a material having a refractive index higher than that of silicon dioxide.

In some implementations, the optical antenna further includes a cladding layer disposed above the waveguide layer. The cladding layer includes a light-transmitting material. A refractive index of the light-transmitting material is smaller than that of the second material.

In some implementations, the light-transmitting material is transparent to the light being transmitted in the waveguide layer.

In some implementations, the reflector layer further includes a metallic reflector sheet below the separation layer.

In some implementations, the reflector layer further includes a buried oxide layer above the substrate, and a reflector waveguide structure above the buried oxide layer. The reflector waveguide structure includes a second grating array.

In some implementations, the second grating array is disposed above the substrate. The second grating array includes silicon dioxide formed by an etching process.

In some implementations, the second grating array is disposed above the substrate. The second grating array includes silicon dioxide formed by a chemical deposition process.

In some implementations, the waveguide layer further includes a waveguide sub-layer disposed above the separation layer, a high-refractive-index layer disposed above the waveguide sub-layer, and a thin oxidized layer disposed between the waveguide sub-layer and the high-refractive-index layer. The waveguide sub-layer includes a fourth material. The high-refractive-index layer includes the second material. The thin oxidized layer includes a fifth material. The first grating array is located in the high-refractive-index layer. The refractive index of the fifth material is smaller than that of either the second material or the fourth material.

In some implementations, a thickness of the thin oxidized layer is configured to cause coupling between the light transmitted by the waveguide sub-layer and the light transmitted by the high-refractive-index layer.

In some implementations, the thin oxidized layer is formed by thermal oxidation process.

In some implementations, the fourth material includes one or more of silicon, polysilicon, silicon nitride, or a material having a refractive index higher than that of silicon dioxide.

In some implementations, the fifth material includes one or more of silicon dioxide, or a material having a refractive index lower than that of silicon nitride.

In some implementations, the waveguide sub-layer further includes a third grating array. The third grating array includes silicon dioxide formed by an etching process.

According to another aspect of the present disclosure, an optical phased array transmitter includes a light source, an optical splitter optically coupled to the light source, a phase shifter optically coupled to the optical splitter, and an optical antenna optically coupled to the phase shifter and having a plurality of emitters. The optical splitter splits one beam of light emitted from the light source into a plurality of beams of light. The phase shifter includes a plurality of channels. Each of the emitters further includes a substrate that forms at least a portion of a reflector layer, a waveguide layer disposed above the reflector layer, and a separation layer disposed between the waveguide layer and the reflector layer. The reflector layer includes a first material. The waveguide layer transmits one split beam of light and includes a second material. The separation layer includes a third material. The waive guide layer further includes a first grating array. The reflector layer reflects the light emitted downwards from the waveguide layer. A refractive index of the third material is smaller than that of either the first material or the second material.

In some implementations, the optical splitter, the phase shifter, and the optical antenna are on one photonic integrated circuit.

In some implementations, the light source is on the photonic integrated circuit.

In some implementations, the number of split beams of light, the number of channels of the phase shifter, and the number of emitters of the optical antenna are the same.

In some implementations, the number of split beams of light is a power of two.

In some implementations, the light source is a laser.

In some implementations, the light source generates a laser beam with a wavelength that ranges from infrared to ultraviolet spectrum.

In some implementations, the optical phased array transmitter further includes a cladding layer disposed above the waveguide layer. The cladding layer includes a light-transmitting material. A refractive index of the light-transmitting material is smaller than that of the second material.

In some implementations, the reflector layer further includes a metallic reflector sheet below the separation layer.

In some implementations, the reflector layer further includes a buried oxide layer above the substrate, and a reflector waveguide structure above the buried oxide layer. The reflector waveguide structure includes a second grating array.

In some implementations, the waveguide layer further includes a waveguide sub-layer disposed above the separation layer, a high-refractive-index layer disposed above the waveguide sub-layer, and a thin oxidized layer disposed between the waveguide sub-layer and the high-refractive-index layer. The waveguide sub-layer includes a fourth material. The high-refractive-index layer includes the second material. The thin oxidized layer includes a fifth material. The first grating array is located in the high-refractive-index layer. The refractive index of the fifth material is smaller than that of either the second material or the fourth material.

In some implementations, the waveguide sub-layer further includes a third grating array. The third grating array includes silicon dioxide formed by an etching process.

According to yet another aspect of the present disclosure, a lidar system includes an optical phased array transmitter having a first optical antenna, an optical phased array receiver having a second optical antenna, system electronics, and a power supply. The first optical antenna includes a plurality of emitters. The second optical antenna includes a plurality of receiving elements. Each of the emitters and the receiving elements further includes a substrate that forms at least a portion of a reflector layer, a waveguide layer disposed above the reflector layer, and a separation layer disposed between the waveguide layer and the reflector layer. The reflector layer includes a first material. The waveguide layer transmits one split beam of light and includes a second material. The separation layer includes a third material. The waive guide layer further includes a first grating array. The reflector layer reflects the light emitted downwards from the waveguide layer. A refractive index of the third material is smaller than that of either the first material or the second material.

In some implementations, the system electronics further include a communication interface configured to transmit and receive data from the optical phased array transmitter and the optical phased array receiver.

In some implementations, the system electronics further include one or more sensors configured to provide information concerning one or more of speed, acceleration, or geographical location of the lidar system.

In some implementations, the lidar system further includes a cladding layer disposed above the waveguide layer. The cladding layer includes a light-transmitting material. A refractive index of the light-transmitting material is smaller than that of the second material.

In some implementations, the reflector layer further includes a metallic reflector sheet below the separation layer.

In some implementations, the reflector layer further includes a buried oxide layer above the substrate, and a reflector waveguide structure above the buried oxide layer. The reflector waveguide structure includes a second grating array.

In some implementations, the waveguide layer further includes a waveguide sub-layer disposed above the separation layer, a high-refractive-index layer disposed above the waveguide sub-layer, and a thin oxidized layer disposed between the waveguide sub-layer and the high-refractive-index layer. The waveguide sub-layer includes a fourth material. The high-refractive-index layer includes the second material. The thin oxidized layer includes a fifth material. The first grating array is located in the high-refractive-index layer. The refractive index of the fifth material is smaller than that of either the second material or the fourth material.

In some implementations, the waveguide sub-layer further includes a third grating array, the third grating array includes silicon dioxide formed by an etching process.

Optical antennas, OPA transmitters, and lidar systems according to the current disclosure have numerous advantages. Because the previously unused downwards emitted light can be reflected back to the upper surface of the optical antenna, the emission efficiency of the optical antenna according to the current disclosure can be greatly enhanced and the loss of energy can be dramatically reduced. Moreover, because the separation layer in optical antennas are designed to have a thickness that facilitates constructive interference between the emitted light and reflected light, the ranging distance and far-field patterns of the beams emitted from the OPA transmitter are also improved. The process for fabricating optical antennas is also made easy, as the widely used CMOS manufacture technology can be applied to the current disclosure, including but not limited to etching, chemical deposition, etc. Furthermore, since SOI architecture is compatible with optical antennas where a silicon-on-insulator structure (e.g., a silicon layer over a buried oxide layer) is provided, mass-production of such optical antennas based on commercially available SOI wafers are relatively easy.

It will be apparent to those skilled in the art that various modifications and variations can be made to the disclosed devices and related apparatuses. Other embodiments will be apparent to those skilled in the art from consideration of the specification and practice of the disclosed devices and related apparatuses.

It is intended that the specification and examples be considered as exemplary only, with a true scope being indicated by the following claims and their equivalents.

What is claimed is:

1. An optical antenna for light transmission, comprising:
   a substrate that forms at least a portion of a reflector layer, the reflector layer comprising a first material;
   a waveguide layer disposed above the reflector layer, the waveguide layer transmitting light and comprising a second material; and
   a separation layer disposed between the waveguide layer and the reflector layer, the separation layer comprising a third material,
   wherein the waveguide layer further comprises:
      a first grating array;
      a waveguide sub-layer disposed above the separation layer, the waveguide sub-layer comprising a fourth material;
      a high-refractive-index layer disposed above the waveguide sub-layer, the high-refractive-index layer comprising the second material; and
      a thin oxidized layer disposed between the waveguide sub-layer and the high-refractive-index layer, the thin oxidized layer comprising a fifth material,
      wherein the first grating array is located in the high-refractive-index layer, a refractive index of the fifth material is smaller than that of either the second material or the fourth material,
   wherein the reflector layer reflects the light emitted downwards from the waveguide layer, and
   wherein a refractive index of the third material is smaller than that of either the first material or the second material.

2. The optical antenna of claim 1, wherein a wavelength of the light is in the range approximately between 200 and 3,000 nm.

3. The optical antenna of claim 1, wherein a thickness of the separation layer is configured to cause constructive interference between the light emitted upwards from the waveguide layer and the light reflected upwards from the reflector layer.

4. The optical antenna of claim 1, wherein the first grating array of the waveguide layer has a pitch in the range approximately between 400 and 1,800 nm.

5. The optical antenna of claim 1, wherein the first material and the second material each comprises one or more of silicon, polysilicon, silicon nitride, or a material having a refractive index higher than that of silicon dioxide.

6. The optical antenna of claim 1, further comprising a cladding layer disposed above the waveguide layer, the cladding layer comprising a light-transmitting material,
   wherein a refractive index of the light-transmitting material is smaller than that of the second material.

7. The optical antenna of claim 1, wherein the reflector layer further comprises a metallic reflector sheet below the separation layer.

8. The optical antenna of claim 1, wherein the reflector layer further comprises:
   a buried oxide layer above the substrate, and
   a reflector waveguide structure above the buried oxide layer, the reflector waveguide structure comprising a second grating array.

9. The optical antenna of claim 1, wherein a thickness of the thin oxidized layer is configured to cause coupling between the light transmitted by the waveguide sub-layer and the light transmitted by the high-refractive-index layer.

10. The optical antenna of claim 1, wherein the fourth material comprises one or more of silicon, polysilicon, silicon nitride, or a material having a refractive index higher than that of silicon dioxide.

11. The optical antenna of claim 1, wherein the fifth material comprises one or more of silicon dioxide, or a material having a refractive index lower than that of silicon nitride.

12. The optical antenna of claim 1, wherein the waveguide sub-layer further comprises a third grating array.

13. An optical phased array transmitter, comprising:
a light source;
an optical splitter optically coupled to the light source, the optical splitter splitting one beam of light emitted from the light source into a plurality of beams of light;
a phase shifter optically coupled to the optical splitter, the phase shifter comprising a plurality of channels; and
an optical antenna optically coupled to the phase shifter and comprising a plurality of emitters, each of the emitters further comprising:
a substrate that forms at least a portion of a reflector layer, the reflector layer comprising a first material;
a waveguide layer disposed above the reflector layer, the waveguide layer transmitting one split beam of light and comprising a second material; and
a separation layer disposed between the waveguide layer and the reflector layer, the separation layer comprising a third material,
wherein the waveguide layer further comprises:
a first grating array;
a waveguide sub-layer disposed above the separation layer, the waveguide sub-layer comprising a fourth material;
a high-refractive-index layer disposed above the waveguide sub-layer, the high-refractive-index layer comprising the second material; and
a thin oxidized layer disposed between the waveguide sub-layer and the high-refractive-index layer, the thin oxidized layer comprising a fifth material,
wherein the first grating array is located in the high-refractive-index layer, a refractive index of the fifth material is smaller than that of either the second material or the fourth material,
wherein the reflector layer reflects light emitted downwards from the waveguide layer, and
wherein the refractive index of the third material is smaller than that of either the first material or the second material.

14. The optical phased array transmitter of claim 13, wherein the optical splitter, the phase shifter, and the optical antenna are on one photonic integrated circuit.

15. The optical phased array transmitter of claim 14, wherein the light source is on the photonic integrated circuit.

16. The optical phased array transmitter of claim 13, wherein the number of split beams of light, the number of channels of the phase shifter, and the number of emitters of the optical antenna are the same.

* * * * *